United States Patent [19]

Losser et al.

[11] Patent Number: 4,712,767
[45] Date of Patent: Dec. 15, 1987

[54] SOLENOID CONTROL VALVE

[75] Inventors: Gerald L. Losser, Gloucester; Richard D. Weaver, Williamsburg, both of Va.

[73] Assignee: Allied Corporation, Morris Township, Morris County, N.J.

[21] Appl. No.: 925,006

[22] Filed: Oct. 29, 1986

[51] Int. Cl.$^4$ .............................................. F16K 31/06
[52] U.S. Cl. ........................ 251/129.14; 251/129.15; 251/129.19
[58] Field of Search ............... 251/129.14, 129.15, 251/129.19

[56] References Cited

U.S. PATENT DOCUMENTS

| 834,626 | 10/1906 | Longacre | 251/129.14 X |
| 3,791,408 | 2/1974 | Saitou et al. | 251/129.15 X |
| 3,851,285 | 11/1974 | Rothfuss et al. | 251/129.15 X |
| 3,921,111 | 11/1975 | Kowalski | 251/129.15 X |

FOREIGN PATENT DOCUMENTS

| 1181744 | 1/1959 | France | 251/129.14 |
| 885729 | 12/1961 | United Kingdom | 251/129.15 |

Primary Examiner—Arnold Rosenthal
Attorney, Agent, or Firm—Russel C. Wells; Markell Seitzman

[57] ABSTRACT

A solenoid control valve for use in adaptive braking systems has a unique armature for reducing the operating times of the valve. When the solenoid is energized, the armature moves towards a plunger mechanism which operates to open a ball valve in the inlet of the solenoid control valve. When the solenoid is de-energized, a first spring bias means operates to close the ball valve stopping the flow of the fluid from the source to a hydraulic means. The unique armature has at least one axially extending passageway from one end surface to the other and in addition has a circular groove intersecting the passageway on the top surface of the armature abutting the plunger to provide a relief means to reduce surface adhesion.

3 Claims, 7 Drawing Figures

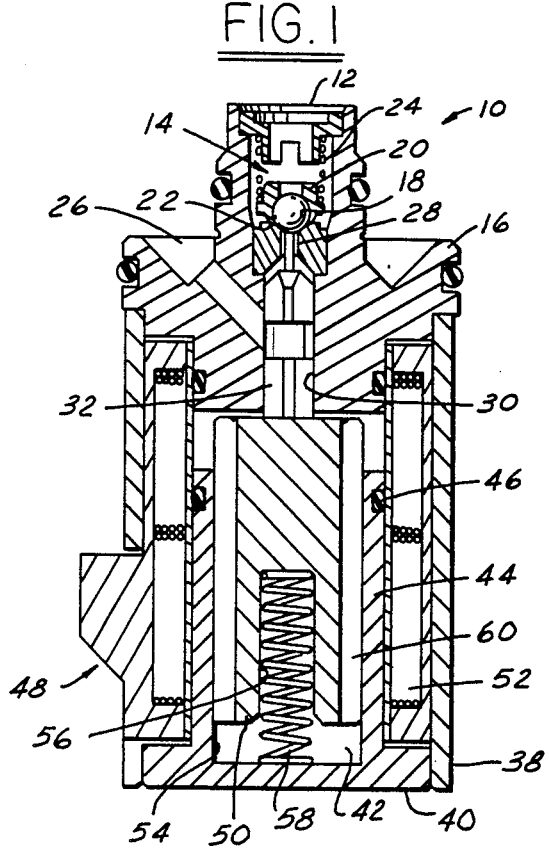
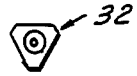
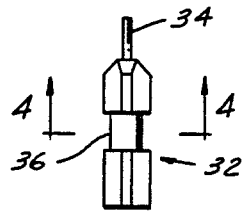
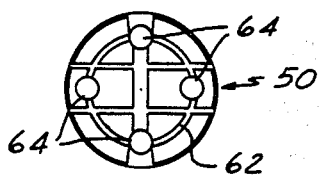
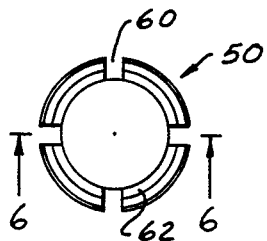
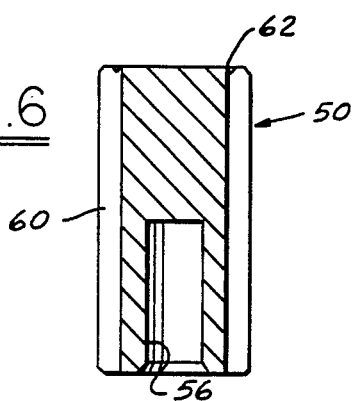

SOLENOID CONTROL VALVE

This invention relates to solenoid control valves in general and more particularly to armatures for high speed electromagnetic solenoids as may be found in adaptive braking systems.

BACKGROUND OF INVENTION

Adaptive braking systems require very fast response times of the several electromechanical parts in order to be effective. One of the many components of the system are solenoid operated valves and pumps.

SUMMARY OF INVENTION

A solenoid control valve having a first body member with an inlet means at one end and a second body member extending therefrom. Enclosing the other end of the second body member is an insert member having a base portion and a circular rib extending from the base portion to define a cavity. A solenoid encircles the rib. Located in the first body member is a ball valve means between the inlet means and a plunger cavity. The ball valve means is biased by a first spring means to a closed position for preventing the flow of fluid from the inlet means to the plunger cavity.

A plunger is located in the plunger cavity and moves reciprocally therein from one position opening the ball valve means to another position allowing the ball valve means to close. An armature is located in the cavity defined by the circular rib, and is normally biased in a position abutting the plunger and operable by the solenoid to reciprocally move in the cavity to move the plunger for opening the ball valve means. The armature has at least one passageway axially extending longitudinally from the one end adjacent the plunger to the other end. The one end of the armature has a circular groove intersecting the at least one passageway.

Many other objects and purposes of the invention will be clear from the following detailed description of the drawings.

BRIEF DESCRIPTION OF THE DRAWINGS

In the Drawings:

FIG. 1 is an axially extending sectional view of a solenoid valve illustrating the preferred embodiment of the armature therein.

FIG. 2 is a top view of a plunger in the preferred embodiment of the valve.

FIG. 3 is a plan view of the plunger of FIG. 2.

FIG. 4 is a section view taken along line 4—4 of FIG. 3.

FIG. 5 is a top view of the preferred embodiment of the armature.

FIG. 6 is a sectional plan view of the preferred embodiment of the armature taken along line 6—6 of FIG. 5.

FIG. 7 is a top view of another embodiment of the armature.

DETAILED DESCRIPTION OF THE PREFERRED EMBODIMENT

FIG. 1 is a sectional plan view of a solenoid control valve 10 as may be used in an adaptive braking system. In particular this valve 10 is a build or decay valve. Its function is to pulse fluid at high speed to and from the wheel cylinders of the vehicle during an anti-skid event to bring the vehicle to a safe stop or under control.

Fluid enters the solenoid control valve 10 through the inlet 12 at one end thereof through a ball valve means 14 located in a first body member 16. The ball valve means 14 comprises a ball 18, a ball carrier 20, a valve seat 22 and a first spring means 24. The ball valve means 14 is normally biased in a closed condition by the first spring means 24 interconnected between the inlet of the solenoid control valve 10 and the ball carrier 20. The ball carrier 20, under the influence of the first spring means 24, moves the ball 18 into a seating arrangement with the valve seat 22 of the ball valve means 14.

The ball valve means 14 operates to stop the flow of fluid between the inlet 12 of the solenoid control valve 10 and an outlet 26. In the particular arrangement illustrated in FIG. 1, when the ball valve means 14 is open, the fluid flows past the ball valve means 14 through an aperture 28 in the valve seat 22 and into a plunger cavity 30. Located in the plunger cavity 30 is a plunger 32 as illustrated in FIGS. 2-4. The plunger 32 has an extending pin 34 which bears against the ball 18 and, as will hereinafter be shown, operates to move the ball 18 off of the valve seat 22 allowing the flow of fluid past the ball 18, valve seat 22, and into the aperture 28.

In the preferred embodiment, the plunger 32 is substantially triangular-shaped, as illustrated in FIG. 4, allowing the flow of fluid thereby from the one end having the pin 34 to the other end. Intermediate the ends of the plunger 32, there is a modified section 36 which is adjacent the outlet 26 of the valve 10. This modified section 36 has a larger volume to contain fluid and to permit the fluid flowing along each side to flow out of the outlet 26.

Connected to the first body member 16, at the end opposite the inlet 12, is a second body member 38 having an insert 40 with a base portion and an axially extending armature cavity 42 formed by a circular rib means 44, an o-ring 46 encircling the rib means 44b at the end opposite the base portion, and solenoid 48 means including an armature 50 and a solenoid coil 52 concentric with the insert 40 and the second body member 38 and surrounding the armature cavity 42.

The armature 50 of the solenoid means 48 is located in the armature cavity 42 of the insert 40. The internal surface 54 of the circular rib 44 guides the armature 50 as it moves in a reciprocal direction. The armature 50, as illustrated in FIGS. 5 and 6, has a central counterbore 56 extending from one end for housing and locating a second spring bias means 58 for biasing the armature 50 away from the bottom of the cavity 42 at the base portion of the insert 40 and into contact with the plunger 32.

The armature 50 is a cylindrical member having at least one passageway or aperture 60 axially extending from one end to the other end of the armature 50. A relief means or circular groove 62 is in the top face of the armature and intersects the aperture. In the preferred embodiment, as illustrated in FIGS. 5 and 6, there are four apertures 60 in the form of slots equally and angularly spaced along the outside surface of the armature and parallel to the axis. The circular groove 62 intersects all four apertures 60. The function of the apertures 60 and the circular groove 62 is to speed up the operate time of the solenoid means 48. When two wet surfaces abut each other there is a "stiction" or a force of adhesion between the two abutting surfaces. The circular groove 62 provides a relief to this "stiction" and reduces the surface adhesion.

When the solenoid coil 52 is energized, the armature 50 is moved toward the first body member 16 and the plunger 32. The plunger 32 is moved against the ball 18 opening the valve. The first spring bias means 24 bearing against the ball valve carrier 20 is compressed and the fluid flows from the inlet 12 through the ball valve seat 22, along the plunger 32 to the modified section 36 thereof and out the outlet 26.

When the solenoid coil 52 is de-energized, the first spring bias means 24 against the ball valve carrier 20 moves the plunger 32 and the armature 50 to compress the second spring bias means 58. This causes the ball 18 to return to the valve seat 22 closing the ball valve means 14.

FIG. 7 is a plan view of another embodiment of the armature 50 wherein there are four longitudinally extending bores 64 through the armature 50. Along the top surface of the armature, the circular groove 62 interconnects all of the bores 64.

Also illustrated in FIG. 1 are several o-rings for sealing various volumes from the flow of fluid.

Many changes and modifications in the above described embodiment of the invention can, of course, be carried out without departing from the scope thereof. Accordingly, that scope is intended to be limited only by the scope of the appended claims.

We claim:

1. In an adaptive braking system having a solenoid operated control valve for receiving fluid at one end thereof, a valve means adjacent the one end and biased closed, a plunger means reciprocally actuated to open the valve means, a solenoid means having an armature normally biased into contact with the plunger means, the improvement comprising:
   the armature having at least one aperture axially extending for allowing passage of fluid therethrough from one end thereof to the other end when the armature is moved by the energizing of the solenoid means for effecting the opening of the valve means and;
   circular groove means at one end thereof in contact with the plunger means and intersecting said aperture for reducing the adhesion between the armature and the plunger.

2. In an adaptive braking system having a solenoid operated control valve according to claim 1 wherein the aperture is in the form of a slot extending along the surface thereof and parallel to the axis of the armature.

3. In an adaptive braking system having a solenoid operated control valve according to claim 1 wherein the armature is cylindrical and has four equally and angularly spaced slots along the cylindrical surface thereof and said circular groove means interconnects each of said slots.

* * * * *